United States Patent
Franke et al.

(10) Patent No.: US 6,668,217 B1
(45) Date of Patent: Dec. 23, 2003

(54) METHOD FOR OPTIMIZING ENERGY IN THE MANNER IN WHICH A VEHICLE OR TRAIN IS DRIVEN USING KINETIC ENERGY

(75) Inventors: Rudiger Franke, Heidelberg (DE); Peter Terwiesch, Wohlenschwiel (CH); Markus Meyer, Ebikon (CH); Christian Klose, Havel (DE); Karl-Hermann Ketteler, Kleindoltingen (CH)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 10/031,976
(22) PCT Filed: Jul. 26, 2000
(86) PCT No.: PCT/EP00/07147
§ 371 (c)(1), (2), (4) Date: Aug. 9, 2002
(87) PCT Pub. No.: WO01/08955
PCT Pub. Date: Feb. 8, 2001

(30) Foreign Application Priority Data

Jul. 29, 1999 (DE) .......................... 199 35 349

(51) Int. Cl.⁷ ................. B60K 41/18; B60K 41/02; G06F 15/20
(52) U.S. Cl. ................. 701/19; 701/51; 477/128
(58) Field of Search .................. 701/19, 51, 58, 701/112, 69, 105, 110, 54; 477/128, 131, 62, 65, 94, 102, 111; 267/150, 154; 123/3, 46 E

(56) References Cited

U.S. PATENT DOCUMENTS

| | | | | |
|---|---|---|---|---|
| 4,959,786 A | * | 9/1990 | Glowczewski et al. | .. 364/424.1 |
| 4,965,728 A | * | 10/1990 | Leising et al. | ........... 364/424.1 |
| 4,998,200 A | * | 3/1991 | Glowczewski et al. | .. 364/424.1 |
| 5,002,020 A | * | 3/1991 | Kos | ......................... 123/46 E |
| 5,239,472 A | | 8/1993 | Long et al. | ............. 364/426.05 |
| 5,630,449 A | * | 5/1997 | Ammann et al. | ....... 139/188 R |

FOREIGN PATENT DOCUMENTS

| CH | 255 132 A | 3/1986 |
|---|---|---|
| DE | 129 761 A | 2/1978 |
| DE | 30 26 652 A | 11/1982 |
| DE | 208 324 A | 5/1984 |
| DE | 236 705 A | 6/1986 |
| DE | 262 836 A | 12/1988 |
| DE | 266 539 A | 4/1989 |
| EP | 467 377 B | 1/1992 |

* cited by examiner

*Primary Examiner*—Tan Q. Nguyen
*Assistant Examiner*—Dalena Tran
(74) *Attorney, Agent, or Firm*—Howrey Simon Arnold & White

(57) ABSTRACT

A method for power optimization in a vehicle/train is proposed, using time reserves which are included when planning a schedule, an overall route to be traveled between a starting stop and a destination stop being subdivided into a number of steps. In order to achieve a power-saving travel mode, with the aid of an optimization algorithm, the kinetic energy of the vehicle and the time are used as state variables in a vehicle model. The changes in the state variables are considered with respect to the distance in each step.

2 Claims, 1 Drawing Sheet

Figure 1:
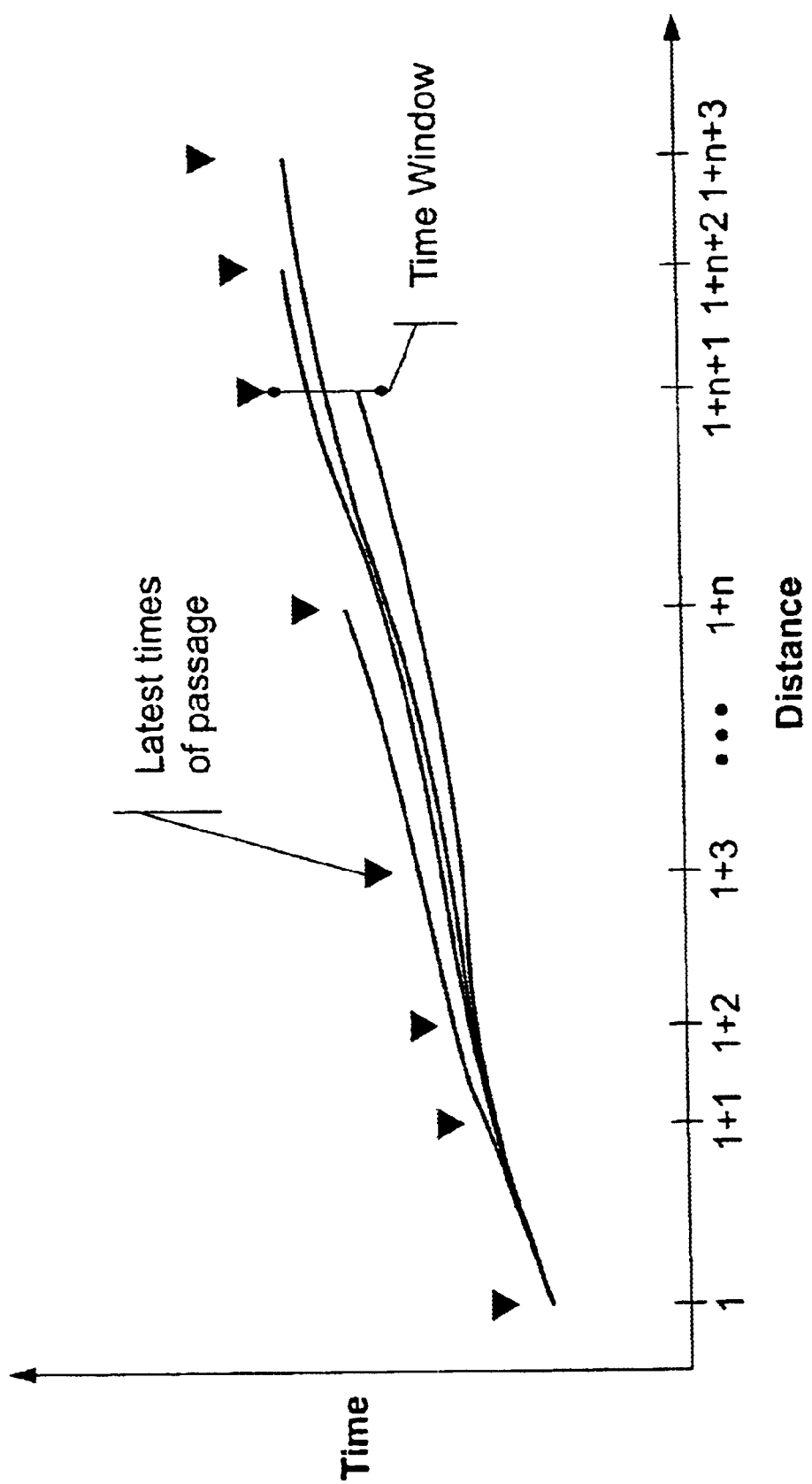

METHOD FOR OPTIMIZING ENERGY IN THE MANNER IN WHICH A VEHICLE OR TRAIN IS DRIVEN USING KINETIC ENERGY

BACKGROUND OF THE INVENTION

1. Field of the Invention

The invention relates to a method for power optimization of the travel mode in a vehicle/train according to the preamble of claim 1.

2. Description of the Related Art

When schedules for rail traffic are drawn up, time reserves for unforeseen events and adverse operating conditions are included in the plans. Since during real journeys the operating conditions are typically. more favorable than assumed in the plan, the time reserves which arise become available for other purposes. A particularly practical use of the time reserves is the saving of power by means of a suitable travel mode of the vehicle/train.

In this connection, DE 30 26 652 A1, DD 255 132 A1 and EP 0 467 377 B1 disclose methods relating to how a vehicle is moved in a power-optimal manner between two stops. In the case of long routes, a subdivision into a number of sections is proposed, an optimum partial solution being determined in each section, and the overall solution resulting from the combination of the partial solutions.

DE 30 26 652 A1 and EP 0 467 377 B1 concern a system structure in which methods for power minimization can be realized, account being taken of an overall route between two stops (stop stations).

The previously known methods are based on a vehicle model which contains the speed of the vehicle as a significant variable. Models for describing the speed change over the distance are, however, disadvantageously very nonlinear. The use of an iterative numerical algorithm to solve the implicit nonlinear equations is critical, in particular in real-time application. No explicit analytical solution is known.

BRIEF SUMMARY OF THE INVENTION

The invention is based on the object of specifying an improved method for power optimization of the travel mode in a vehicle/train having an overall route subdivided into a number of sections.

This object is achieved, in conjunction with the preamble, by the features specified in claim 1.

The advantages which can be achieved by the invention consist in particular in the fact that by using the equation of motion for the kinetic energy of the vehicle in the vehicle model, the optimization calculation is simplified. The use of an explicit analytical solution of the equation of motion for the kinetic energy of the vehicle permits prior determination of the necessary computing effort, which is important in particular for the use under real-time conditions.

Advantageous refinements of the invention are identified in the subclaims.

Further advantages of the proposed method emerge from the following description.

DESCRIPTION OF ILLUSTRATIVE EMBODIMENTS

The invention will be explained in more detail below.

The nub of the invention is to be seen in the fact that in order to calculate the optimum travel mode in the vehicle model or differential equation model, instead of the speed of the vehicle, the equation of motion for the kinetic energy of the vehicle is considered, that is to say the kinetic energy $E_{kin}$ of the vehicle and time t are used as state variables. By this means, the analytical solution of the equation of motion is possible, whereby the optimization method is simplified considerably.

The changes in the state variables with respect to the distance s are considered. The differential equation model has the form:

$$\frac{de_{kin}}{ds} = A - B\sqrt{e_{kin}} - C \cdot e_{kin}, \quad e_{kin}(0) = e_0,$$

$$\frac{dt}{ds} = D\sqrt{\frac{1}{e_{kin}}}, \quad t(0) = t_0, \text{ with } D = \frac{\sqrt{2}}{2}.$$

The term A includes the tractive force (acceleration and braking) applied by the drive system, the route resistance and constant components of the travel resistance. The terms B and C describe speed-dependent parts of the travel resistance, in particular C describes the air resistance and B the running-gear coefficient for interfering movements. The variable $e_{kin}$ describes the specific kinetic energy of the vehicle/train normalized to the vehicle mass m (train mass):

$$e_{kin} = \frac{1}{m \cdot \rho} E_{kin} = \frac{1}{2} v^2,$$

where ρ is an additional factor for rotating masses and v is the speed of the vehicle.

For the optimization, the route considered is broken down into a plurality of steps, so that in each step the maximum speed and terms A and C can be assumed to be constant. The term B is also included in an approximate manner in the terms C and A, so that B=0. For each step, the following analytical solution of the differential equations indicated is then used to calculate the change in the kinetic energy and the time used Δt:

$$e_{kin}(s) = \frac{A}{C} + \left(e_{kin}(0) - \frac{A}{C}\right) \cdot \exp(-C \cdot s),$$

$$t(s) = t(0) + \Delta t(s),$$

where for A>0 and C|A·$e_{kin}$(0)=1 (constant speed), it is true that:

$$\Delta t(s) = \frac{D \cdot s}{\sqrt{e_{kin}(0)}},$$

for A>0 and C|A·$e_{kin}$(0)≠1, it is true that:

$$\Delta t(s) = \frac{2D}{\sqrt{A \cdot C}} \text{artanh}\left(\frac{x-y}{1-x \cdot y}\right),$$

-continued $$x = \sqrt{1 + \left(\frac{C}{A}e_{kin}(0) - 1\right)\exp(-C \cdot s)}, \quad y = \sqrt{\frac{C}{A}e_{kin}(0)},$$

for $$\frac{-C \cdot e_{kin}(0)}{[\exp(C \cdot s) - 1]} < A < 0$$

it is true that:

$$\Delta t(s) = \frac{2D}{\sqrt{-A \cdot C}} \arctan\left(\frac{x - y}{1 + x \cdot y}\right),$$

$$x = \sqrt{-\left(1 + \left(\frac{C}{A}e_{kin}(0) - 1\right)\exp(-C \cdot s)\right)}, \quad y = \sqrt{-\frac{C}{A}e_{kin}(0)},$$

for A=0, it is true that:

$$\Delta t(s) = \frac{2D}{C\sqrt{e_{kin}(0)}}\left[\exp\left(\frac{C}{2}s\right) - 1\right]$$

The optimization problem is accordingly formulated as a multi-step problem and solved with a suitable optimization algorithm. Suitable optimization algorithms are, for example, "dynamic programming" by Bellman, or a transfer into and solution as a nonlinear optimization problem. The algorithms are known, for example, from Papageorgiou: Optimization, Chapter 10, 19 and in particular 20, Oldenbourg Verlag, 1996.

List of Designations

A Tractive force (acceleration and braking) applied by the drive system, route resistance and constant components of the travel resistance
B Speed-dependent part of the travel resistance (running-gear coefficient for interfering movements)
C Speed-dependent part of the travel resistance (air resistance)
D $\sqrt{2}/2$
$E_{kin}$ kinetic energy of the vehicle/train
$e_{kin}$ specific kinetic energy of the vehicle/train normalized to the vehicle mass
$e_0$ initial value of $e_{kin}$
m Vehicle mass
s Distance
t Time
$t_0$ Initial value of the time t
$\Delta t$ Time used
v Speed of the vehicle/train
$\rho$ Additional factor for rotating masses

What is claimed is:

1. A method for power optimization in a vehicle traveling over a route, the vehicle having a drive system and a travel resistance, the route having a route resistance, the method comprising:

planning a schedule for the vehicle to travel over the route, the schedule including a time reserve; and
determining a power-saving travel mode for the vehicle using an optimization algorithm which takes account of the time reserve and a vehicle model, wherein kinetic energy of the vehicle and time are used as state variables in the vehicle model, and changes in the state variables with respect to distance travelled over the route are determined based on the following differential equations:

$$\frac{de_{kin}}{ds} = A - B\sqrt{e_{kin}} - C \cdot e_{kin}, \text{ and } \frac{dt}{ds} = D\sqrt{\frac{1}{e_{kin}}},$$

with $$D = \frac{\sqrt{2}}{2},$$

where $$e_{kin} = \frac{1}{m \cdot \rho}E_{kin} = \frac{1}{2}v^2,$$

and where:
$E_{kin}$ is kinetic energy of the vehicle,
$e_{kin}$ is specific kinetic energy of the vehicle normalised to the vehicle mass,
A is tractive force (acceleration and braking) applied by a drive system of the vehicle, route resistance and constant components of the travel resistance,
B is a speed-dependent part of the travel resistance (running-gear coefficient for interfering movements),
C is a speed-dependent part of the travel resistance (air resistance),
m is mass of the vehicle,
s is distance traveled over the route,
t is time elapsed,
v is speed of the vehicle, and
$\rho$ is an additional factor for rotating masses.

2. The method as claimed in claim 1, wherein the route is divided into a plurality of steps, for each step a maximum speed being assumed and the terms A and C of the vehicle model are assumed to be constant, and wherein the step of determining a power-saving travel mode for the vehicle further comprises using the following analytical solution:

$$e_{kin}(s) = \frac{A}{C} + \left(e_{kin}(0) - \frac{A}{C}\right) \cdot \exp(-C \cdot s),$$

$$t(s) = t(0) + \Delta t(s),$$

where for A>0 and $C/A \cdot e_{kin}(0) = 1$ it is true that:

$$\Delta t(s) = \frac{Ds}{\sqrt{e(0)}},$$

for A>0 and $C/A \cdot e_{kin}(0) \neq 1$ it is true that:

$$\Delta t(s) = \frac{2D}{\sqrt{AC}} \text{ or tanh}\left(\frac{x-y}{1-xy}\right),$$

$$x = \sqrt{1 + \left(\frac{C}{A}e_{kin}(0) - 1\right)\exp(-Cs)}, \quad y = \sqrt{\frac{C}{A}e_{kin}(0)},$$

for $$\frac{-C \cdot e_{kin}(0)}{[\exp(C \cdot s) - 1]} < A < 0$$

it is true that:

$$\Delta t(s) = \frac{2D}{\sqrt{-AC}} \text{ or } \tanh\left(\frac{y-x}{1-xy}\right),$$

$$x = \sqrt{-\left(1 + \left(\frac{C}{A}e_{kin}(0) - 1\right)\exp(-Cs)\right)}, \quad y = \sqrt{-\frac{C}{A}e_{kin}(0)},$$

and for A=0 it is true that:

$$\Delta t(s) = \frac{2D}{C\sqrt{e(o)}}\left[\exp\left(\frac{C}{2}s\right) - 1\right],$$

where $\Delta t$ is time elapsed.

* * * * *

UNITED STATES PATENT AND TRADEMARK OFFICE
CERTIFICATE OF CORRECTION

PATENT NO.     : 6,668,217 B1
DATED          : December 23, 2003
INVENTOR(S)    : Franke et al.

It is certified that error appears in the above-identified patent and that said Letters Patent is hereby corrected as shown below:

<u>Column 4,</u>
Line 62, replace the words "or tanh" by -- artanh --;

<u>Column 5,</u>
Line 11, replace the words "or tanh" by -- arctan --.

Signed and Sealed this

Second Day of November, 2004

JON W. DUDAS
*Director of the United States Patent and Trademark Office*